US011947721B2

(12) United States Patent
Nakamura (10) Patent No.: US 11,947,721 B2
(45) Date of Patent: Apr. 2, 2024

(54) VEHICLE DISPLAY CONTROL APPARATUS AND DISPLAY PROCESSING METHOD (71) Applicant: TOYOTA JIDOSHA KABUSHIKI KAISHA, Aichi-ken (JP)

(72) Inventor: Akihito Nakamura, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/297,008

(22) Filed: Apr. 7, 2023

(65) Prior Publication Data

US 2023/0400919 A1 Dec. 14, 2023

(30) Foreign Application Priority Data

Jun. 10, 2022 (JP) ................. 2022-094580

(51) Int. Cl.
G06F 3/01 (2006.01)
G06T 7/70 (2017.01)
(52) U.S. Cl.
CPC ................ G06F 3/013 (2013.01); G06T 7/70 (2017.01); G06T 2207/30201 (2013.01); G06T 2207/30268 (2013.01)
(58) Field of Classification Search
None
See application file for complete search history.

(56) References Cited

U.S. PATENT DOCUMENTS

| 2018/0032300 | A1* | 2/2018 | Singh | B60K 35/00 |
| 2019/0109939 | A1* | 4/2019 | Tsuji | B60R 11/0235 |
| 2023/0300290 | A1* | 9/2023 | Nakamura | G06F 3/013 |
| | | | | 348/744 |

FOREIGN PATENT DOCUMENTS

JP 2009023565 A 2/2009

* cited by examiner

Primary Examiner — Nicholas J Lee
(74) Attorney, Agent, or Firm — HAUPTMAN HAM, LLP (57) ABSTRACT In a vehicle display control apparatus, a line of sight of a driver is detected, and a visual field of the driver is estimated from the detected line of sight. Then, display information displayed on a display unit of a vehicle is controlled based on a positional relationship between the estimated visual field and the display unit. As a result, the information to be displayed can be controlled in accordance with a recognition level of the driver for the information displayed on the display unit based on the positional relationship between the visual field of the driver and the display unit, and the information can be displayed in a mode easily recognized by the driver.

6 Claims, 8 Drawing Sheets

VEHICLE DISPLAY CONTROL APPARATUS AND DISPLAY PROCESSING METHOD

CROSS-REFERENCE TO RELATED APPLICATION

This application claims priority to Japanese Patent Application No. 2022-094580 filed on Jun. 10, 2022, incorporated herein by reference in its entirety.

BACKGROUND

1. Technical Field

The present disclosure relates to a vehicle display control apparatus and a display processing method.

2. Description of Related Art

Japanese Unexamined Patent Application Publication No. 2009-023565 (JP 2009-023565 A) discloses a driving assistance apparatus that detects a line of sight of a driver, decides a display target that needs monitoring based on the detected line of sight, and displays the decided display target on a monitor provided in an instrument panel.

SUMMARY

By the way, since a line of sight of a driver is moved while the driver is driving, a display unit in a vehicle cabin is not always included a visual field of the driver. Therefore, a recognition level of the driver for information displayed on the display unit is changed depending on a position of the display unit with respect to the visual field of the driver.

For example, in a case where the display unit is present at a center portion of the visual field of the driver, the recognition level of the driver for display information is high, and detailed information, such as character information, is easily recognized. On the other hand, in a case where the display unit is present at an edge of the visual field of the driver, the recognition level of the driver for the display unit may be lowered, and the recognition of the character information and the like may be a burden on the driver.

The present disclosure is made in consideration of the above facts, and is to reduce a burden on a driver in a case of recognizing information displayed on a display unit in consideration of a visual field of the driver.

A first aspect of the present disclosure relates to a vehicle display control apparatus including a line-of-sight detection unit, a visual field estimation unit, and a display controller. The line-of-sight detection unit is configured to detect a line of sight of a driver. The visual field estimation unit is configured to estimate a visual field of the driver from the detected line of sight. The display controller is configured to control display information displayed on a display unit of a vehicle based on a positional relationship between the estimated visual field and the display unit.

In the vehicle display control apparatus according to the first aspect, the line of sight of the driver is detected, and the visual field of the driver is estimated from the detected line of sight. Then, the display information displayed on the display unit of the vehicle is controlled based on the positional relationship between the estimated visual field and the display unit. Therefore, the information to be displayed can be controlled in accordance with the recognition level of the driver for the information displayed on the display unit based on the positional relationship between the visual field of the driver and the display unit, and the information can be displayed in a mode easily recognized by the driver. As a result, the burden on the driver in a case of recognizing the information displayed on the display unit can be reduced in consideration of the visual field of the driver.

A second aspect of the present disclosure relates to the vehicle display control apparatus according to the first aspect, in which the visual field estimation unit may be configured to estimate a predetermined range around a center of the line of sight of the driver as the visual field of the driver, and the display controller may be configured to display the display information in a case where the display unit is present inside the estimated visual field of the driver.

In the vehicle display control apparatus according to the second aspect, the predetermined range around the center of the line of sight of the driver is estimated as the visual field of the driver. Then, the display information is displayed at a timing when the display unit is included inside the visual field of the driver. As a result, the information can be provided at a timing when the driver turns his/her line of sight to the display unit, and a recognition burden on the driver can be reduced.

A third aspect of the present disclosure relates to the vehicle display control apparatus according to the first or second aspect, in which the visual field estimation unit may be configured to estimate a predetermined range around a center of the line of sight of the driver as the visual field of the driver, and the display controller may be configured to change a mode of the display information based on a positional relationship between the center of the line of sight of the driver and the display unit in a case where the display unit is present inside the estimated visual field of the driver.

In the vehicle display control apparatus according to the third aspect, in a case where the display unit is present inside the visual field of the driver, the mode of the display information is changed based on the positional relationship between the center of the line of sight of the driver and the display unit. As a result, for example, in consideration of the point that the recognition level of the driver different at the center portion and the edge of the visual field of the driver, an amount of the displayed information can be controlled, so that the recognition burden on the driver can be reduced.

A fourth aspect of the present disclosure relates to the vehicle display control apparatus according to the third aspect, in which the visual field estimation unit may be configured to estimate a first visual field that is a range of a central visual field of the driver, and the display controller may be configured to display the display information in a mode including character information in a case where the display unit is present inside the first visual field, and display the display information in a mode not including the character information in a case where the display unit is present outside the first visual field.

In the vehicle display control apparatus according to the fourth aspect, the first visual field that is the range of the central visual field of the driver is estimated. Then, in a case where the display unit is present inside the first visual field, the display information is displayed in the mode including the character information. On the other hand, in a case where the display unit is present outside the first visual field, the display information is displayed in the mode not including the character information. As a result, the recognition burden on the driver can be reduced by increasing the amount of specific information in a case where the display unit is present inside the central visual field in which the recognition level of the driver is highest, and reducing the amount of the information in a case where the display unit is present outside the central visual field in which the recognition level of the driver is lowered.

A fifth aspect of the present disclosure relates to the vehicle display control apparatus according to the third aspect, in which the visual field estimation unit may be configured to estimate a second visual field that is a range of an effective visual field of the driver, and the display controller may be configured to display the display information in a color-enhanced mode in a case where the display unit is present outside the second visual field.

In the vehicle display control apparatus according to the fifth aspect, the second visual field that is the range of the effective visual field of the driver is estimated. Then, in a case where the display unit is present outside the second visual field, the display information is displayed in the color-enhanced mode. As a result, in general, in a case where the display unit is present "outside the effective visual field" in which the color can be identified whereas the recognition of a specific shape or character is difficult, the recognition burden on the driver can be reduced by displaying the display information in the color-enhanced mode.

A sixth aspect of the present disclosure relates to the vehicle display control apparatus according to the first aspect, in which the visual field estimation unit may be configured to estimate a center of the line of sight of the driver after $\Delta T$ seconds based on an angular velocity indicating a movement speed of the line of sight of the driver, and estimate a predetermined range around the center of the line of sight as the visual field of the driver.

In the vehicle display control apparatus according to the sixth aspect, the center of the line of sight of the driver after $\Delta T$ seconds is estimated based on the angular velocity indicating the movement speed of the line of sight of the driver. As a result, since the display information can be controlled by predicting the visual field of the driver after $\Delta T$ seconds, the information can be displayed on the display unit without delaying movement of an actual visual field of the driver, so that the recognition burden on the driver can be reduced.

A seventh aspect of the present disclosure relates to the vehicle display control apparatus according to the first aspect, in which the visual field estimation unit may be configured to detect a fixation point at which the line of sight of the driver is fixed, and estimate a visual field angle to a second fixation point with a first fixation point as a center of the line of sight as a range of the visual field of the driver in a case where movement from the first fixation point to the second fixation point is made within $\Delta t$ seconds and a displacement amount in a vertical direction of the line of sight of the driver with respect to an imaginary line segment connecting the first fixation point and the second fixation point is within $\Delta d$ m.

In the vehicle display control apparatus according to the seventh aspect, the fixation point at which the line of sight of the driver is fixed is detected, and a threshold value condition is provided in a movement time $\Delta t$ of the line of sight between the first fixation point and the second fixation point and a displacement amount $\Delta d$ in the vertical direction of the line of sight of the driver with respect to the imaginary line segment connecting the first fixation point and the second fixation point. Then, in a case where the threshold value condition is satisfied, the visual field angle to the second fixation point with the first fixation point as the center of the line of sight is estimated as the range of the visual field of the driver. As a result, the range of the visual field in which individual differences occur can be set in accordance with a characteristic of the driver, so that the recognition burden on the driver can be reduced.

An eighth aspect of the present disclosure relates to the vehicle display control apparatus according to the first aspect, in which the display information may be evaluation information for a driving operation of the driver.

In the vehicle display control apparatus according to the eighth aspect, the evaluation information for the driving operation of the driver can be displayed in a mode with a less burden on the driver. The configuration contributes to simultaneously reducing the psychological annoyance felt by the driver regarding the evaluation.

A ninth aspect of the present disclosure relates to a display processing method including detecting a line of sight of a driver, estimating a visual field of the driver from the detected line of sight, and controlling display information displayed on a display unit of a vehicle based on a positional relationship between the estimated visual field and the display unit.

In the display processing method according to the ninth aspect, as described above, the burden on the driver in a case of recognizing the information displayed on the display unit can be reduced in consideration of the visual field of the driver.

As described above, the vehicle display control apparatus according to the aspect of the present disclosure has an excellent effect that the burden on the driver in a case of recognizing the information displayed on the display unit can be reduced in consideration of the visual field of the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a system S including a vehicle display control apparatus 10 according to the present embodiment will be described with reference to FIGS. 1 to 8.

Figure 1:
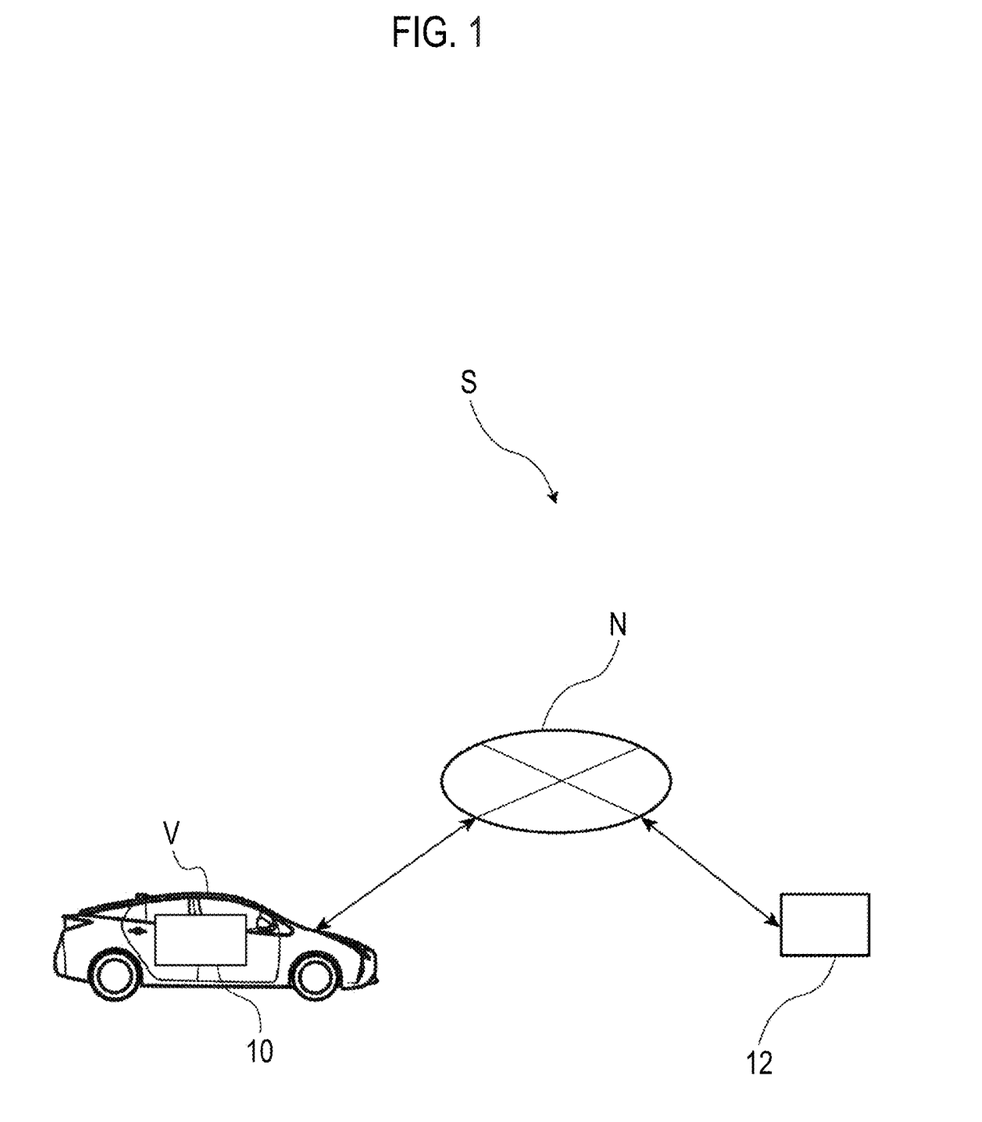
FIG. 1 is a schematic diagram showing an overall configuration of a driving evaluation system including a vehicle display control apparatus according to an embodiment.

As shown in FIG. 1, the system S according to the present embodiment includes a vehicle display control apparatus 10 mounted on a vehicle V and a driving evaluation apparatus 12. Then, the vehicle V and the driving evaluation apparatus 12 are connected by a network N. Note that, although a plurality of vehicles V is connected to the network N, solely one vehicle V is shown in FIG. 1 for convenience of description.

The driving evaluation apparatus 12 according to the present embodiment is, for example, a control apparatus provided outside the vehicle V.

Here, the vehicle display control apparatus 10 according to the present embodiment displays, as "display information", evaluation information for a driving operation of a driver P (see FIG. 6) who drives each vehicle V on display units 23 (A to C) of the vehicle V. In this case, the vehicle display control apparatus 10 estimates a visual field of the driver P from a line of sight of the driver P, and controls the display of the information on the display units 23 (A to C).

In the present embodiment, a plurality of display units 23 (A to C) provided in a vehicle cabin of the vehicle V will be described as an example of a "display unit" according to the embodiment of the present disclosure. The vehicle display control apparatus can display the display information on selected part or all of the display units 23 (A to C). Note that, in a case where the display units are not distinguished from each other, the description will be made simply as the display unit 23.

Figure 2:
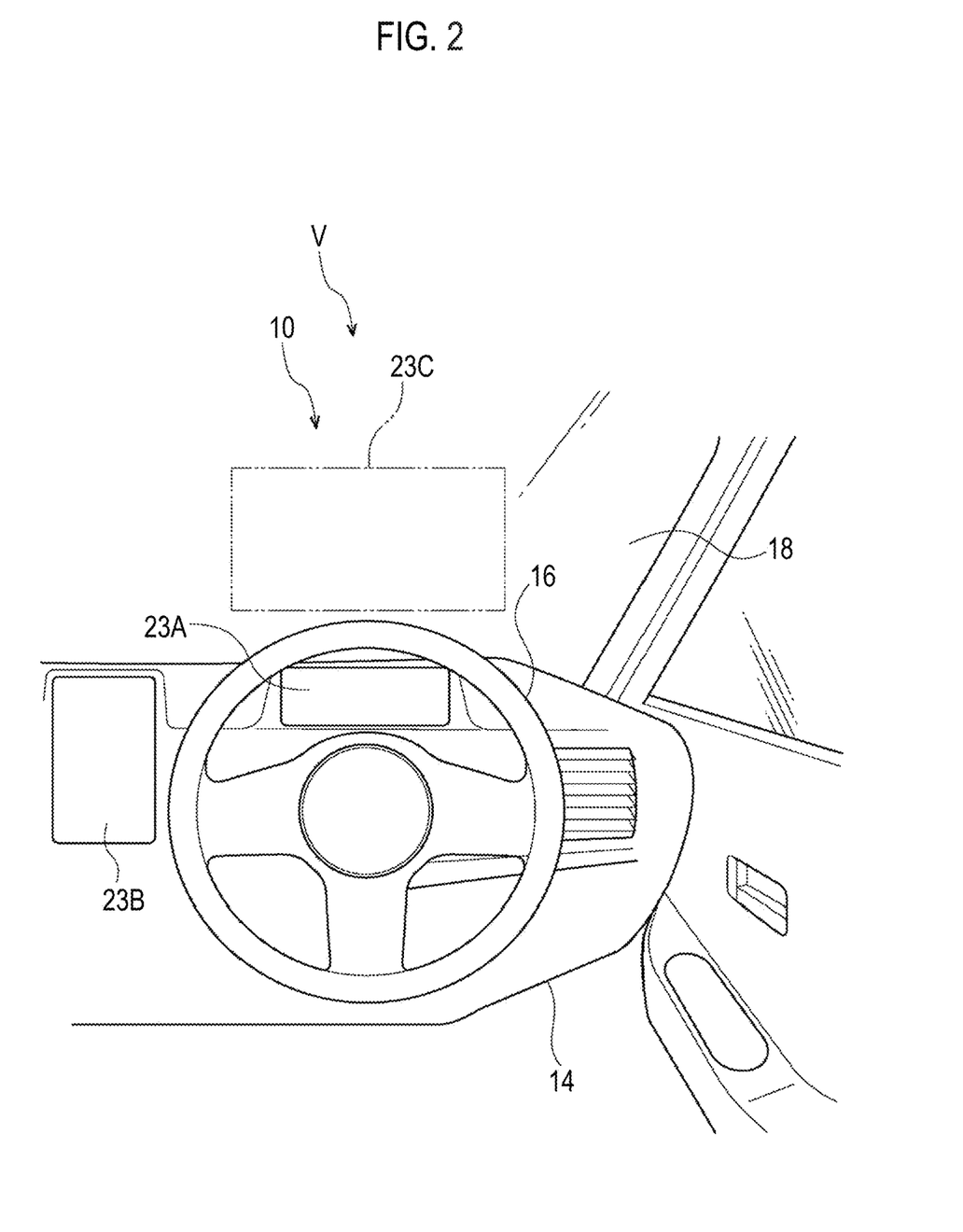
FIG. 2 is a schematic view of a front portion of a vehicle cabin of a vehicle to which the vehicle display control apparatus according to the embodiment is applied, viewed from a rear side of the vehicle.

As shown in FIG. 2, the display units 23 (A to C) are provided in a front portion of the vehicle cabin of the vehicle V. An instrument panel 14 is provided in the front portion of the vehicle cabin of the vehicle V. The instrument panel 14 extends in a width direction of the vehicle, and a steering wheel 16 is provided in the instrument panel 14 on a right side of the vehicle. That is, in the present embodiment, as an example, the vehicle is a right-hand drive vehicle in which the steering wheel 16 is provided on the right side, and a driver's seat is set on the right side of the vehicle.

A first display unit 23A is configured by a meter display provided on a vehicle front side of the driver's seat in a right side portion of the instrument panel 14 in the width direction of the vehicle. The first display unit 23A is provided at a position that comes into sight of the driver P in a state in which the driver P turns the line of sight to the vehicle front side.

A second display unit 23B is configured by a display provided on the vehicle front side of the driver's seat in a center portion of the instrument panel 14 in the width direction of the vehicle.

A third display unit 23C is provided on a windshield 18. The third display unit 23C is set on a vehicle upper side of the first display unit 23A, and is configured by a projection surface projected by a head-up display apparatus (not shown). Specifically, the head-up display apparatus is provided on the vehicle front side of the instrument panel 14, and an image is projected from the head-up display apparatus onto the third display unit 23C of the windshield 18.

Hardware Configuration of Vehicle Display Control Apparatus 10

Figure 3:
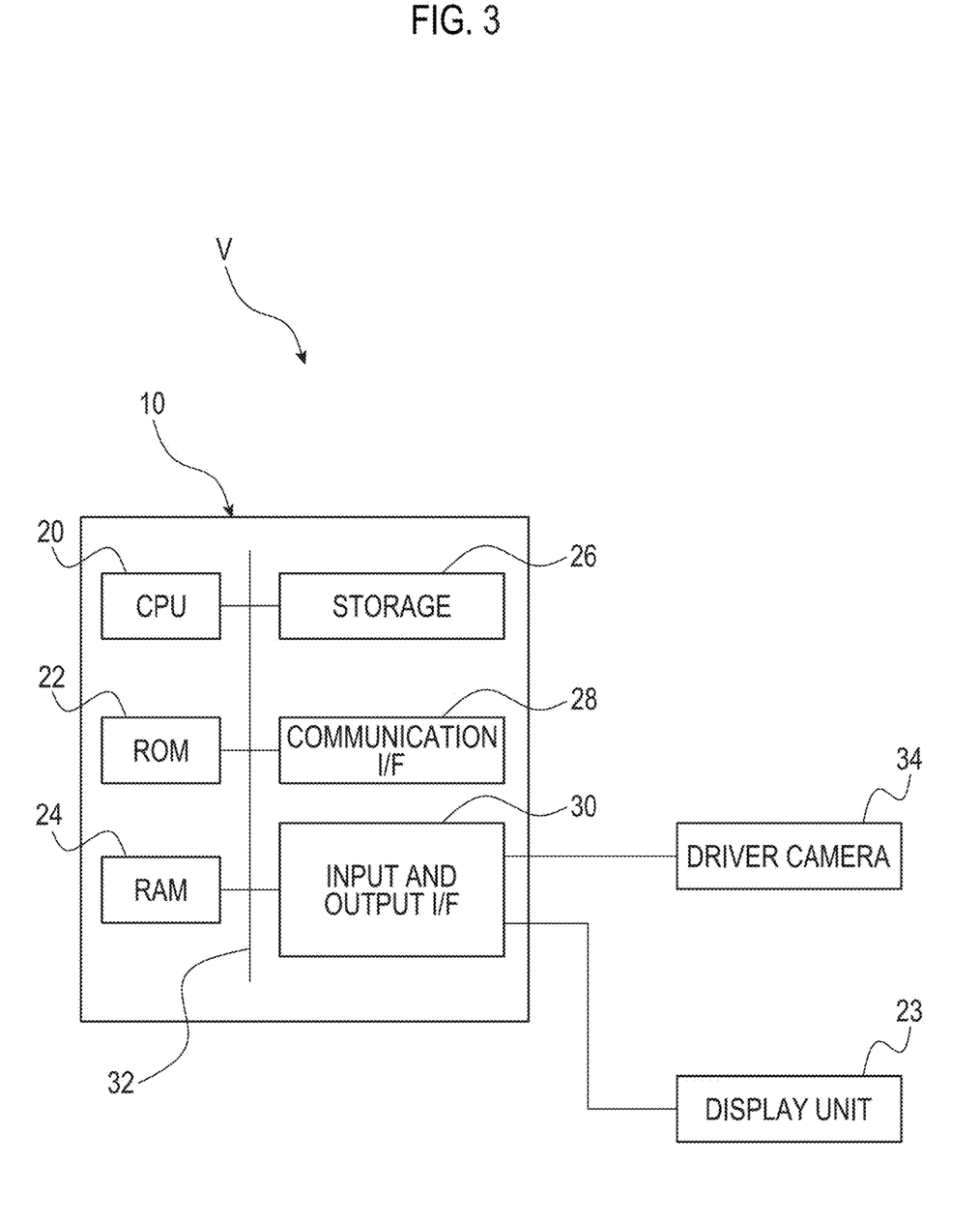
FIG. 3 is a block diagram showing a hardware configuration of the vehicle display control apparatus according to the embodiment.

FIG. 3 is a block diagram showing a hardware configuration of the vehicle display control apparatus 10. As shown in FIG. 3, the vehicle display control apparatus 10 includes a central processing unit (CPU: processor) 20, a read only memory (ROM) 22, a random access memory (RAM) 24, a storage 26, a communication interface (communication I/F) 28, and an input and output interface (input and output I/F) 30. The configurations are communicatively connected to each other via a bus 32.

The CPU 20 is a central processing unit that executes various programs and controls each unit. That is, the CPU 20 reads out a program from the ROM 22 or the storage 26 and executes the program by using the RAM 24 as a work area. The CPU 20 performs control of each configuration described above and various operation processing in accordance with the program recorded in the ROM 22 or the storage 26.

The ROM 22 stores various programs and various data. The RAM 24 transitorily stores the programs or the data as the work area. The storage 26 is configured by a hard disk drive (HDD) or a solid state drive (SSD) and stores various programs including an operating system and various data. In the present embodiment, the ROM 22 or the storage 26 stores a program for performing display processing, various data, and the like.

The communication I/F 28 is an interface for the vehicle display control apparatus 10 to communicate with the driving evaluation apparatus 12 and other apparatuses, such as an external server, and a standard, such as a controller area network (CAN), Ethernet (registered trademark), long term evolution (LTE), a fiber distributed data interface (FDDI), or Wi-Fi (registered trademark), is used.

The input and output I/F 30 is electrically connected to a driver camera 34 mounted on the vehicle V and the display units 23 (A to C) in the vehicle cabin. The driver camera 34 is a camera for capturing an image of a face of the driver P, is provided on, for example, the instrument panel 14 or the steering wheel 16, and is disposed toward the driver P. The image data captured by the driver camera 34 is used to detect the line of sight of the driver P.

Hardware Configuration of Driving Evaluation Apparatus 12

Figure 4:
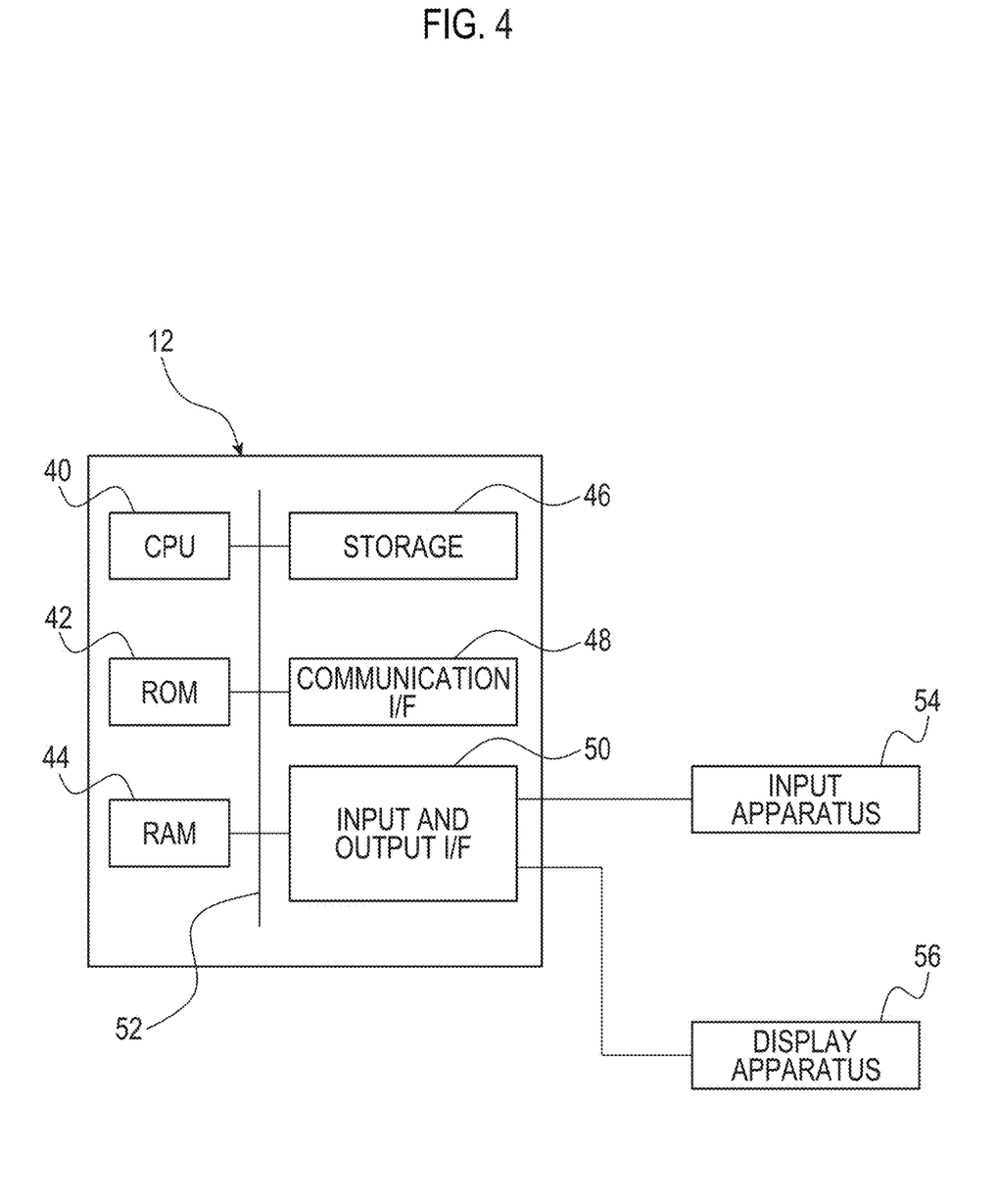
FIG. 4 is a block diagram showing a hardware configuration of a driving evaluation apparatus according to the embodiment.

FIG. 4 is a block diagram showing a hardware configuration of the driving evaluation apparatus 12. As shown in FIG. 4, the driving evaluation apparatus 12 includes a central processing unit (CPU: processor) 40, a read only memory (ROM) 42, a random access memory (RAM) 44, a storage 46, a communication interface (communication I/F) 48, and an input and output interface (input and output I/F) 50. The configurations are communicatively connected to each other via a bus 52.

The CPU 40 is a central processing unit that executes various programs and controls each unit. That is, the CPU 40 reads out a program from the ROM 42 or the storage 46 and executes the program by using the RAM 44 as a work area. The CPU 40 performs control of each configuration described above and various operation processing in accordance with the program recorded in the ROM 42 or the storage 46.

The ROM 42 stores various programs and various data. The RAM 44 transitorily stores the programs or the data as the work area. The storage 46 is configured by a hard disk drive (HDD) or a solid state drive (SSD) and stores various programs including an operating system and various data. In the present embodiment, the ROM 42 or the storage 46 stores a program for performing various processing, various data, and the like.

The communication I/F 48 is an interface for the driving evaluation apparatus 12 to communicate with the vehicle V and other apparatuses, such as an external server, and a standard, such as a CAN, Ethernet (registered trademark), LTE, an FDDI, or Wi-Fi (registered trademark), is used.

The input and output I/F 50 is electrically connected to an input apparatus 54 and a display apparatus 56. The input apparatus 54 is an apparatus for inputting a predetermined instruction to the driving evaluation apparatus 12, and includes, for example, a mouse and a keyboard. The display apparatus 56 is an apparatus, such as a display for displaying information output from the driving evaluation apparatus 12.

The driving evaluation apparatus 12 implements various functions by using the hardware resources described above. In the present embodiment, the driving evaluation apparatus 12 acquires driving data regarding a plurality of driving evaluation items preset for various driving operations, and evaluates the driving operations performed by the driver P based on the acquired driving data. For example, the driving evaluation apparatus 12 calculates a score and counts the number of times for each of the driving evaluation items based on the acquired driving data. The corresponding driving operation is evaluated based on the calculated score. The driving data is transmitted, for example, from the vehicle V to the driving evaluation apparatus 12. Note that the driving data may be transmitted from the vehicle V to the external server, and then transmitted from the external server to the driving evaluation apparatus 12.

Functional Configuration of Vehicle Display Control Apparatus 10

The vehicle display control apparatus 10 implements various functions by using the hardware resources described above. A functional configuration implemented by the vehicle display control apparatus 10 will be described with reference to FIG. 5.

Figure 5:
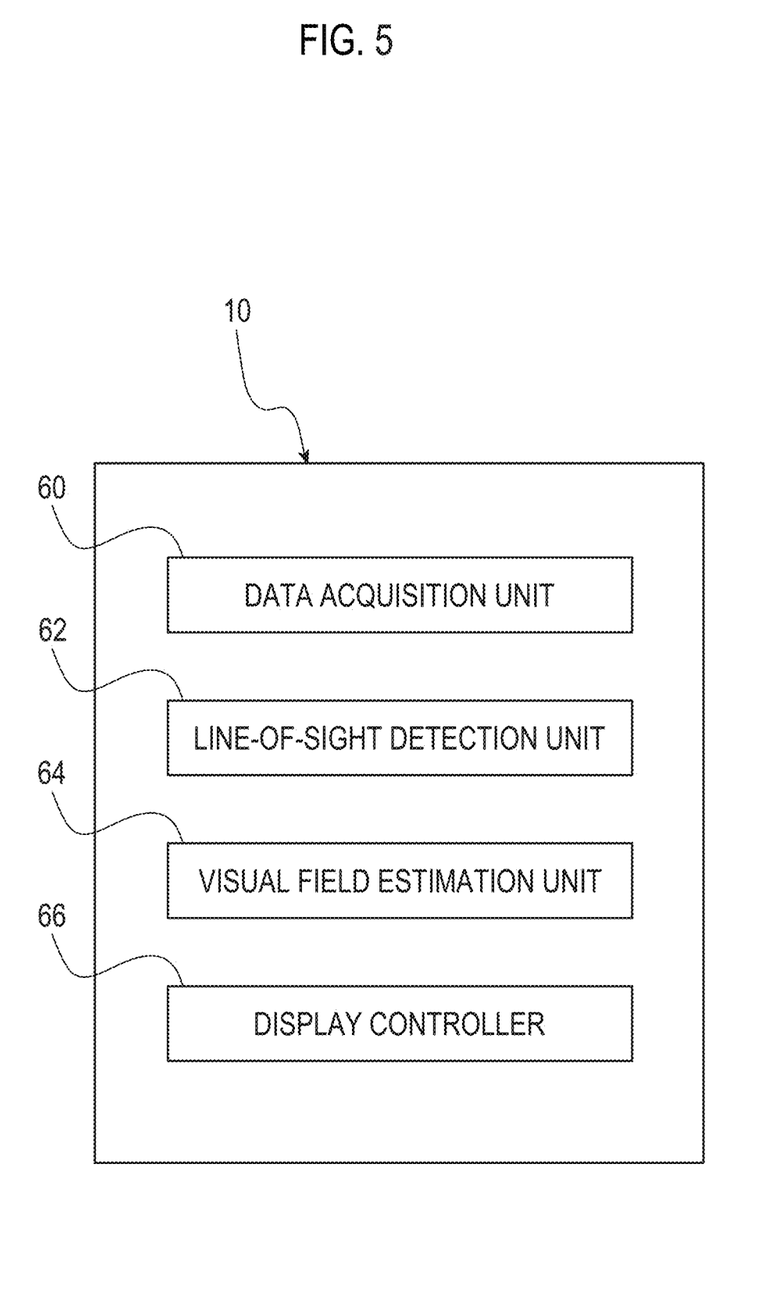
FIG. 5 is a block diagram showing a functional configuration of the vehicle display control apparatus according to the embodiment.

As shown in FIG. 5, the vehicle display control apparatus 10 includes, as the functional configurations, a data acquisition unit 60, a line-of-sight detection unit 62, a visual field estimation unit 64, and a display controller 66. Note that each functional configuration is implemented by the CPU 20 reading out and executing the program stored in the ROM 22 or the storage 26.

The data acquisition unit 60 acquires the evaluation information on the driving operation performed by the driver P of the vehicle V. In the present embodiment, the data acquisition unit 60 acquires the evaluation information for the driving operation transmitted from the driving evaluation apparatus 12 to the vehicle V.

The line-of-sight detection unit 62 detects the line of sight of the driver P. Specifically, the line-of-sight detection unit 62 detects the line of sight of the driver P based on image data of eyeballs of the driver P captured by the driver camera 34.

The visual field estimation unit 64 estimates the visual field of the driver P based on the line of sight detected by the line-of-sight detection unit 62. Specifically, the visual field estimation unit 64 estimates a predetermined range around the center of the line of sight of driver as the visual field of the driver.

Note that the "center of the line of sight" is a fixation point at which the line of sight is fixed in a case where the driver P gazes at one point, and means the center of the visual field of the driver P. In addition, in an example of the present embodiment, the "visual field of the driver" is a range that can be seen in a case where the driver P gazes at one point without moving his/her eyes. In general, a visual field of the human is in a range of 60° on an upper side, 70° on a lower side, and 100° toward an ear side with respect to the center of the line of sight.

Figure 6:
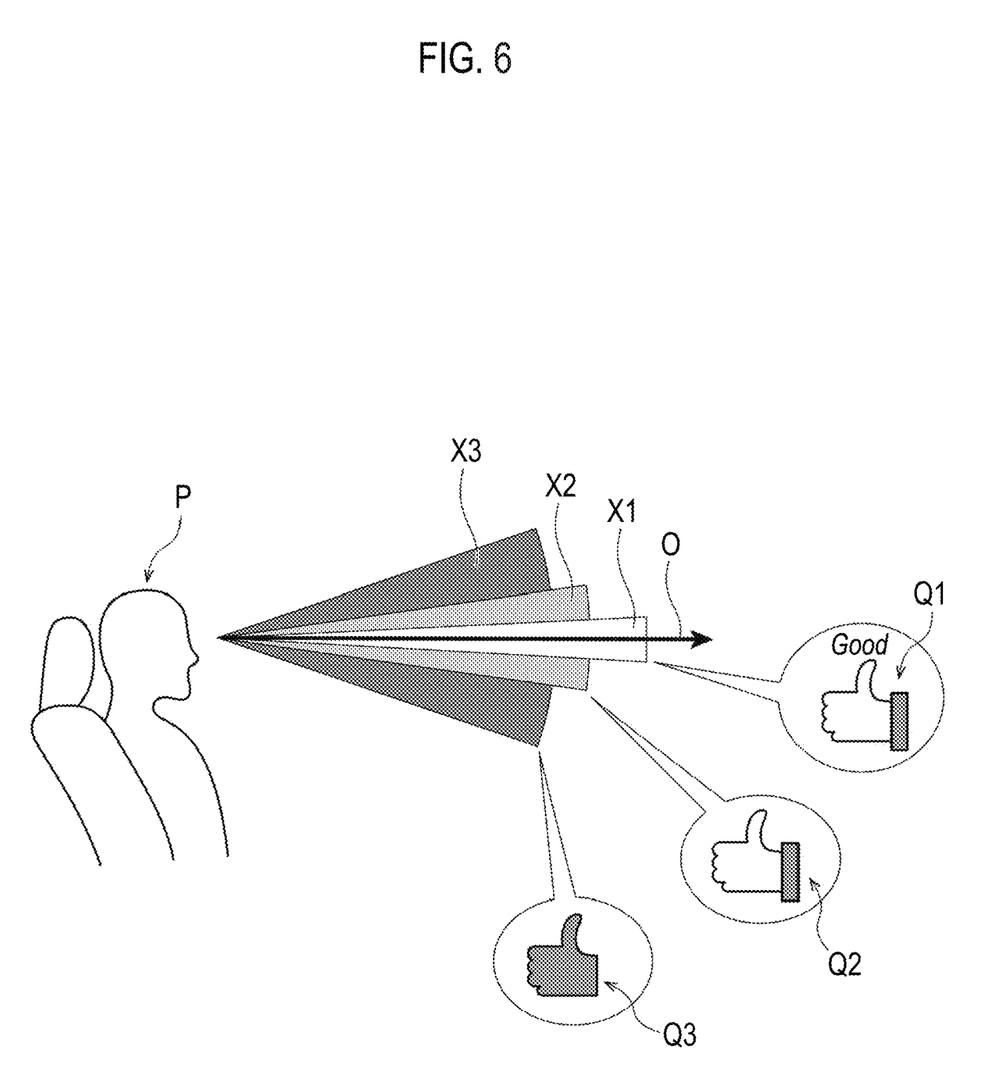
FIG. 6 is a schematic diagram schematically showing an example of a visual field of a driver and a mode of display information displayed on a display unit.

FIG. 6 schematically shows the visual field of the driver estimated by the visual field estimation unit 64. In FIG. 6, an arrow "O" indicates the center of the line of sight of the driver P in a case where the driver P is viewed from the side. In addition, a first visual field with a center O of the line of sight as a center is indicated by reference numeral X1, a second visual field around the first visual field X1 is indicated by reference numeral X2, and a third visual field around the second visual field is indicated by reference numeral X3.

As shown in FIG. 6, the visual field estimation unit 64 divides the visual field with the center O of the line of sight detected from the line of sight of the driver P as a center into three visual fields of the first visual field X1, the second visual field X2, and the third visual field X3 to perform the estimation.

The first visual field X1 indicates a range of a "central visual field" of the driver P. The visual field estimation unit 64 estimates, for example, a range of 1° to 2° on the upper side, the lower side, and the ear side with respect to the center O of the line of sight as the "central visual field". In general, in the visual field of the human, a resolution is highest in the visual field within a visual field angle of 1° to 2° on the upper side, the lower side, and the ear side with respect to the center of the line of sight. The color, shape, character information, or the like of an object is considered to be clearly recognizable in the first visual field X1.

The second visual field X2 indicates a range of an "effective visual field" of the driver P. The visual field estimation unit 64 estimates, for example, a range of 4° to on the upper side, the lower side, and the ear side with respect to the center O of the line of sight as the "effective visual field", the range being around (outside) the first visual field X1. In general, in the visual field of the human, a resolution is relatively high to the visual field within the visual field angle of 4° to 20° on the upper side, the lower side, and the ear side, respectively, with respect to the center of the line of sight around the "central visual field". In the second visual field X2, clear recognition of the character information is difficult, but the color and the shape of the object are considered to be almost clearly recognizable.

The third visual field X3 indicates a range of a "peripheral visual field" of the driver P. The visual field estimation unit 64 estimates, for example, a range of 60° on the upper side, 70° the lower side, and 100° on the ear side with respect to the center O of the line of sight around (outside) the second visual field X2 as the "peripheral visual field". In general, in the visual field of the human, a resolution is relatively low but recognizable to the visual field within the visual field angle of 60° on the upper side, 70° the lower side, and 100° on the ear side with respect to the center of the line of sight around the "effective visual field". In the third visual field X3, clearly understanding the character information or the shape of the object is difficult, but the color of the object or a large motion is considered to be recognizable to some extent.

Here, the visual field estimation unit 64 according to the present embodiment calculates an angular velocity indicating a movement speed of the line of sight of the driver based on the detected line of sight of the driver P, and estimates a position of the center O of the line of sight after $\Delta T$ seconds based on the calculated angular velocity. Then, the visual field with the estimated center O of the line of sight as a center is estimated as the visual field of the driver P after $\Delta T$ seconds. As a result, the display unit can be controlled based on the visual field of the driver P after $\Delta T$ seconds.

A value of $\Delta T$ is set, for example, in accordance with an operation speed of the CPU 20 (processor). As a result, the display unit can be controlled without delaying the movement of the visual field of the driver.

By the way, the visual field angle (area of the peripheral visual field) with the center of the line of sight as a center is known to be changed depending on age or a degree of mental stress. Therefore, in the present embodiment, the fixation point at which the line of sight of the driver P is fixed (that is, the driver P gazes) is detected, and the range of the visual field of the driver P is estimated based on the movement of the line of sight between the detected fixation points.

Note that, in a case of the detection of the fixation point of the driver P, for example, a point or a range in which the line of sight of the driver P is fixed for a time equal to or longer than a predetermined threshold value may be approved as the fixation point.

Figure 7:
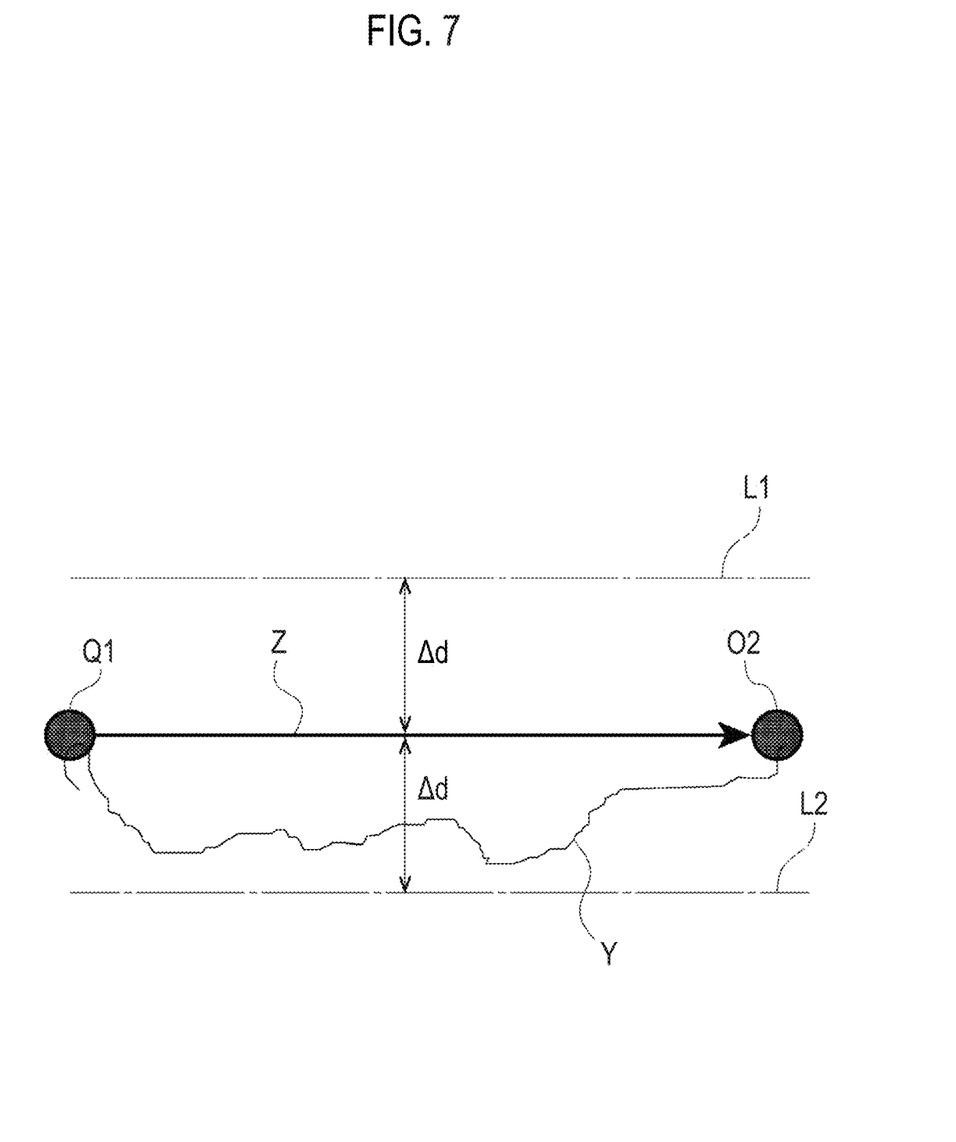
FIG. 7 is a schematic diagram showing a fixation point of the driver.

Specifically, a method of estimating the visual field from the fixation point will be described with reference to FIG. 7. FIG. 7 shows a track Y of the line of sight of the driver P in a case where the line of sight is moved from a first fixation point O1 to a second fixation point O2, and an imaginary line segment (arrow) Z connecting the first fixation point O1 and the second fixation point O2. In addition, two line segments L1, L2 extending in parallel vertically above and below the imaginary line segment Z both indicate positions at which a displacement amount in a vertical direction with respect to the imaginary line segment Z is Δd m.

The visual field estimation unit 64 calculates the visual field angle to the second fixation point O2 with the first fixation point O1 as a center of the line of sight in a case where the movement of the line of sight from the first fixation point O1 to the second fixation point O2 is made within Δt seconds and the displacement amount in the vertical direction of the line of sight Y of the driver P with respect to the imaginary line segment Z connecting the first fixation point O1 and the second fixation point O2 is within Δd m. Then, the magnitude of the calculated visual field angle is estimated as the range of the visual field of the driver P with respect to the center of the line of sight.

The values of Δt seconds and Δd m may be, for example, average values of time obtained from observation values obtained by experimentally observing the movement of the line of-sight between two objects captured inside the visual field. Alternatively, before the driver P drives the vehicle V, the driver P may be caused to gaze at the image displayed on the display unit in the vehicle cabin, and the values of Δt seconds and Δd m may be calculated based on a captured image of the driver camera 34 obtained by capturing the state.

The visual field estimation unit 64 determines that the driver P can clearly recognize two fixation points separated from each other inside the visual field in a case where both a time needed for the movement of the line of sight from the first fixation point O1 to the second fixation point O2 and the displacement amount of the line of sight in the vertical direction are within the threshold values. As a result, the visual field angle to the second fixation point O2 with the first fixation point O1 as a center of the line of sight is estimated as the range of the visual field of the driver P.

The display controller 66 controls the display information displayed on the display units 23 (A to C) based on a positional relationship between the visual field estimated by the visual field estimation unit 64 and the corresponding display units 23 (A to C).

Specifically, in a case where the display unit is present inside the first visual field X1 (central visual field) of the driver P (see FIG. 6), the display controller 66 displays display information Q1 in a mode including the character information. The example of the display information Q1 is a mode including a clear graphic image indicating that the driving operation is good and the character information of "Good".

In addition, in a case where the display unit is present outside (around) the first visual field X1 of the driver P, the display controller 66 displays display information Q2 or display information Q3 in a mode not including the character information.

The display information Q2 is a display mode in a case where the display unit is present inside the second visual field X2 (effective visual field). The example of the display information Q2 is a mode excluding the character information from the display information Q1 and including solely the clear graphic image.

The display information Q3 is a display mode in a case where the display unit is present outside the second visual field X2 and inside the third visual field X3. In the example of the display information Q3, a simple graphic image having the same outer shape as the graphic images of the display information Q1 and the display information Q2 is displayed. The graphic image is a blue monochromatic graphic image such that a blue color indicating that the driving operation is good is enhanced in the image.

In this manner, the display controller 66 changes the mode of the display information displayed on the display unit based on the positional relationship between the center of the line of sight of the driver P and the display unit.

In addition, in a case where the display unit is present outside the third visual field X3, the display controller 66 determines that the display unit is not present inside the visual field of the driver P, and does not display the display information.

Note that in a case where 60% or more of the display unit is present inside a predetermined visual field, a determination may be made that the display unit is present inside the visual field. The numerical value of 60% is merely an example, and can be changed as appropriate.

Action

Next, an action of the present embodiment will be described.

Display Processing

Figure 8:
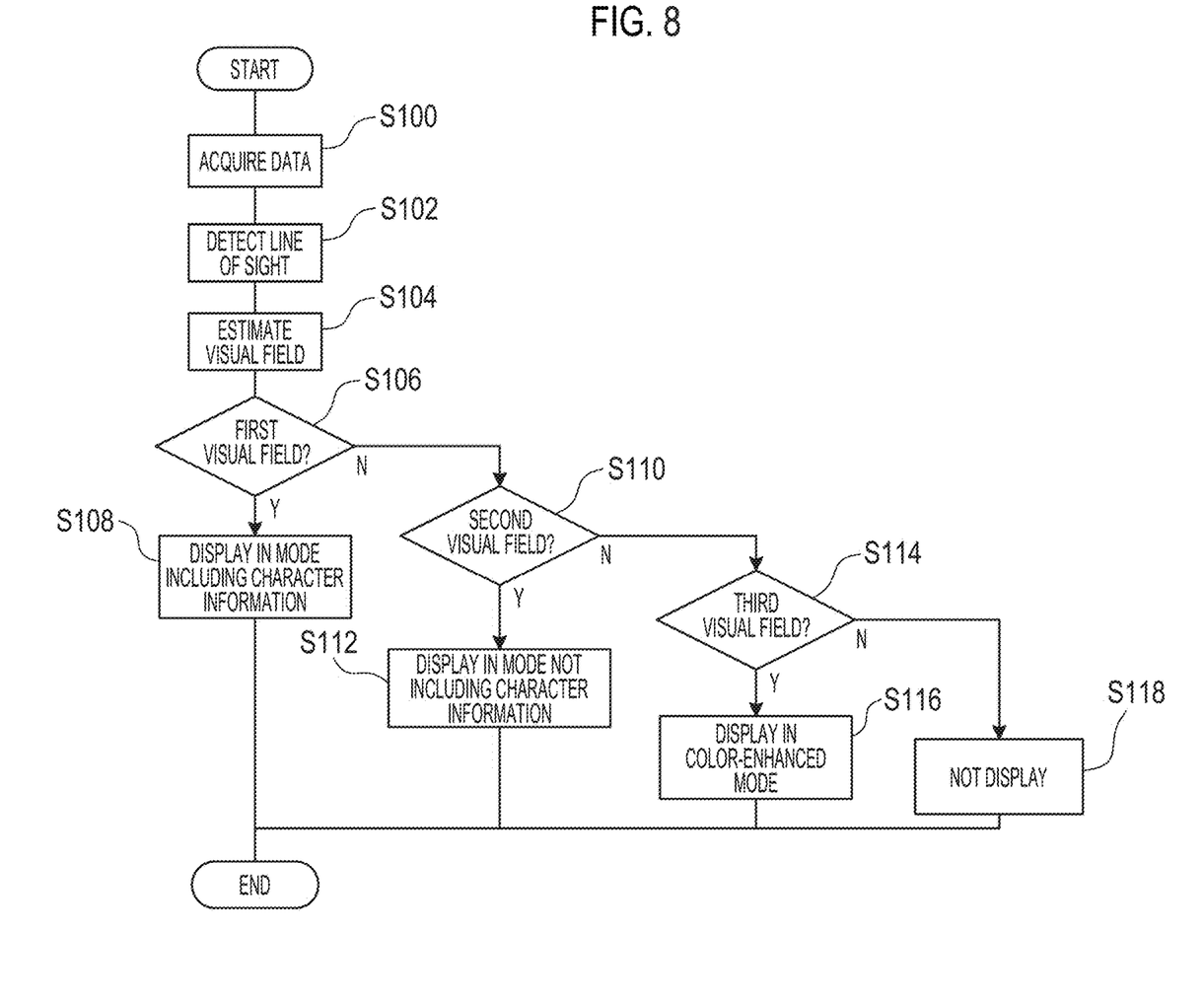
FIG. 8 is a flowchart showing an example of a flow of display processing according to the present embodiment.

An example of a flow of the display processing will be described by using the flowchart shown in FIG. 8. Note that the processing in the vehicle display control apparatus 10 is implemented by the CPU 20 functioning as the data acquisition unit 60, line-of-sight detection unit 62, the visual field estimation unit 64, and display controller 66.

In step S100, the evaluation information for the driving operation transmitted from the driving evaluation apparatus 12 to the vehicle V is acquired by using the function of the data acquisition unit 60.

In step S102, the line of sight of the driver P is detected based on the image data captured by the driver camera 34 by using the function of the line-of-sight detection unit 62.

In step S104, the visual field of the driver P is estimated by using the function of the visual field estimation unit 64. In this case, as described above, based on the angular velocity of the line of sight of the driver P, the position of the center of the line of sight after ΔT seconds is estimated. Then, the visual field of the driver with the estimated center of the line of sight after ΔT seconds as a center is estimated. Specifically, the CPU estimates the first visual field X1, the second visual field X2, and the third visual field X3 of the driver based on the function of the visual field estimation unit.

In step S106, by using the function of the display controller 66, a determination is made as to whether or not the display unit that displays the evaluation information (display information) for the driving operation is present inside the first visual field X1. In a case where the CPU 20 determines that the display unit is present inside the first visual field X1, the CPU 20 proceeds to step S108, and displays the display information Q1 (see FIG. 6) in the mode including the character information on the display unit.

On the other hand, in a case where the CPU 20 determines in step S106 that the display unit is not present inside the first visual field X1, the CPU 20 proceeds to the processing of step S110.

In step S110, by using the function of the display controller 66, a determination is made as to whether or not the display unit is present inside the second visual field X2. In a case where the CPU 20 determines that the display unit is present inside the second visual field X2, the CPU 20 proceeds to step S112, and displays the display information Q2 (see FIG. 6) in the mode not including the character information on the display unit.

On the other hand, in a case where the CPU 20 determines in step S110 that the display unit is not present inside the second visual field X2, the CPU 20 proceeds to the processing of step S114.

In step S114, by using the function of the display controller 66, a determination is made as to whether or not the display unit is present inside the third visual field X3. In a case where the CPU 20 determines that the display unit is present inside the third visual field X3, the CPU 20 proceeds to step S116, and displays the display information Q3 (see FIG. 6) in the color-enhanced mode on the display unit.

On the other hand, in a case where the CPU 20 determines in step S114 that the display unit is not present inside the third visual field X3, the CPU 20 proceeds to the processing of step S118, and terminates the processing without displaying the display information on the display unit.

As described above, the vehicle display control apparatus 10 according to the present embodiment detects the line of sight of the driver P, and estimates the visual fields X1 to X3 of the driver P from the detected line of sight. Then, the display information displayed on the display unit of the vehicle is controlled based on the positional relationship between the estimated visual fields X1 to X3 and the display unit. Therefore, the information to be displayed can be controlled in accordance with the recognition level of the driver for the information displayed on the display unit based on the positional relationship between the visual field of the driver P and the display unit, and the information can be displayed in a mode easily recognized by the driver. As a result, the burden on the driver in a case of recognizing the information displayed on the display unit can be reduced in consideration of the visual field of the driver.

Specifically, the predetermined range (X1 to X3) around the center O of the line of sight of the driver P is estimated as the visual field of the driver. Then, the display information is displayed at a timing when the display unit is included inside the visual field of the driver P. As a result, the information can be provided at a timing when the driver P turns his/her line of sight to the display unit, and a recognition burden on the driver can be reduced.

Further, in a case where the display unit is present inside the visual fields X1 to X3 of the driver P, the mode of the display information is changed based on the positional relationship between the center O of the line of sight of the driver P and the display unit. As a result, in consideration of the point that the recognition level of the driver different at the center portion and the edge of the visual field of the driver, an amount of the displayed information can be controlled, so that the recognition burden on the driver can be reduced.

For example, as shown in FIG. 6, in a case where the display unit is present inside the first visual field X1 that is the range of the central visual field of the driver P, the display information Q1 in the mode including the character information is displayed. On the other hand, in a case where the display unit is present outside the first visual field X1, the display information Q2 is displayed in the mode not including the character information.

As a result, the recognition burden on the driver can be reduced by increasing the amount of specific information in a case where the display unit is present inside the central visual field in which the recognition level of the driver is highest, and reducing the amount of the information in a case where the display unit is present outside the central visual field in which the recognition level of the driver is lowered.

For example, in a case where the display unit is present outside the second visual field X2 (that is, inside the third visual field X3) that is the range of the effective visual field of the driver P, the display information Q1 is displayed in the color-enhanced mode. As a result, in general, in a case where the display unit is present "outside the effective visual field" in which the color can be identified whereas the recognition of a specific shape or character is difficult, the recognition burden on the driver can be reduced by displaying the display information in the color-enhanced mode.

Further, in the present embodiment, the center of the line of sight of the driver after $\Delta T$ seconds is estimated based on the angular velocity indicating the movement speed of the line of sight of the driver P. As a result, since the display information can be controlled by predicting the visual field of the driver P after $\Delta T$ seconds, the information can be displayed on the display unit without delaying movement of the actual visual field of the driver, so that the recognition burden on the driver can be reduced.

In addition, in the present embodiment, the fixation point at which the line of sight of the driver is fixed can be detected, and the visual field corresponding to the characteristic of each driver can be estimated based on the detected fixation point.

Specifically, as shown in FIG. 7, the fixation point at which the line of sight of the driver P is fixed is detected, and the movement time $\Delta t$ of the line of sight between the first fixation point O1 and the second fixation point O2 and the imaginary line segment Z connecting the first fixation point O1 and the second fixation point O2 are set. Then, a threshold value condition is set for the displacement amount $\Delta d$ in the vertical direction of the line of sight of the driver with respect to the imaginary line segment Z. In a case where the displacement amount $\Delta d$ satisfies the threshold value condition, the visual field angle to the second fixation point O2 with the first fixation point O1 as a center O of the line of sight is estimated as the range of the visual field of the driver. As a result, the range of the visual field in which individual differences occur can be set in accordance with a characteristic of the driver, so that the recognition burden on the driver can be reduced.

In the system S including the vehicle display control apparatus 10, the evaluation information for the driving operation of the driver P can be displayed in a mode with a less burden on the driver P. The configuration contributes to simultaneously reducing the psychological annoyance felt by the driver P regarding the evaluation.

Supplementary Description

Although the vehicle display control apparatus 10 according to the embodiment has been described above, of course, various aspects can be implemented without departing from the gist of the present disclosure. For example, in the embodiment described above, the driving evaluation apparatus 12 is provided outside the vehicle V, but the present disclosure is not limited to the above-mentioned, and the driving evaluation apparatus 12 may be mounted on the vehicle V.

In addition, in the embodiment described above, the evaluation information for the driving operation has been described as an example of the display information displayed on the display unit. However, the present disclosure is not limited to the above-mentioned. As the display information displayed on the display unit by the vehicle display control apparatus 10, various information related to driving assistance for the driver can be applied.

Further, various processors other than the CPU 20 may execute the processing executed by the CPU 20 reading the program in the embodiment described above. In this case, examples of the processor include a programmable logic device (PLD) of which a circuit configuration can be changed after manufacturing, such as a field-programmable gate array (FPGA), and a dedicated electric circuit that is a processor having a circuit configuration exclusively designed for executing specific processing, such as an application specific integrated circuit (ASIC). In addition, the processing described above may be executed by one of the various processors, may be executed by a combination of two or more processors of the same type or different types, or may be executed, for example, by a combination of a plurality of FPGAs, and a plurality of CPUs and the FPGAs. More specifically, the hardware structure of the various processors is an electric circuit in which circuit elements, such as semiconductor elements, are combined.

Further, in the embodiment described above, various data are stored in the storage 26 and the storage 46, but the present disclosure is not limited to the above-mentioned. For example, non-transitory recording media, such as a compact disk (CD), a digital versatile disk (DVD), and a universal serial bus (USB) memory, may be used as storage units. In this case, various programs, data, and the like are stored in the recording media.

The invention claimed is:

1. A vehicle display control apparatus comprising:
a line-of-sight detection unit configured to detect a line of sight of a driver;
a visual field estimation unit configured to estimate a visual field of the driver from the detected line of sight; and
a display controller configured to control display information displayed on a display unit of a vehicle based on a positional relationship between the estimated visual field and the display unit, wherein
the visual field estimation unit is configured to estimate a predetermined range around a center of the line of sight of the driver as the visual field of the driver;
the display controller is configured to change a mode of the display information based on a positional relationship between the center of the line of sight of the driver and the display unit in a case where the display unit is present inside the estimated visual field of the driver;
the visual field estimation unit is configured to estimate a first visual field that is a range of a central visual field of the driver; and
the display controller is configured to
display the display information in a mode including character information in a case where the display unit is present inside the first visual field, and
display the display information in a mode not including the character information in a case where the display unit is present outside the first visual field.

2. The vehicle display control apparatus according to claim 1, wherein:
the visual field estimation unit is configured to estimate a second visual field that is a range of an effective visual field of the driver; and
the display controller is configured to display the display information in a color-enhanced mode in a case where the display unit is present outside the second visual field.

3. The vehicle display control apparatus according to claim 1, wherein
the visual field estimation unit is configured to estimate the center of the line of sight of the driver after ΔT seconds based on an angular velocity indicating a movement speed of the line of sight of the driver.

4. A vehicle display control apparatus, comprising:
a line-of-sight detection unit configured to detect a line of sight of a driver;
a visual field estimation unit configured to estimate a visual field of the driver from the detected line of sight; and
a display controller configured to control display information displayed on a display unit of a vehicle based on a positional relationship between the estimated visual field and the display unit, wherein
the visual field estimation unit is configured to
detect a fixation point at which the line of sight of the driver is fixed, and
estimate a visual field angle to a second fixation point with a first fixation point as a center of the line of sight as a range of the visual field of the driver in a case where movement from the first fixation point to the second fixation point is made within Δt seconds and a displacement amount in a vertical direction of the line of sight of the driver with respect to an imaginary line segment connecting the first fixation point and the second fixation point is within Δd m.

5. The vehicle display control apparatus according to claim 1, wherein
the display information is evaluation information for a driving operation of the driver.

6. A display processing method comprising:
detecting a line of sight of a driver;
estimating a visual field of the driver from the detected line of sight; and
controlling display information displayed on a display unit of a vehicle based on a positional relationship between the estimated visual field and the display unit, wherein
the method further comprises:
estimating a predetermined range around a center of the line of sight of the driver as the visual field of the driver,
changing a mode of the display information based on a positional relationship between the center of the line of sight of the driver and the display unit in a case where the display unit is present inside the estimated visual field of the driver,
estimating a first visual field that is a range of a central visual field of the driver, displaying the display information in a mode including character information in a case where the display unit is present inside the first visual field, and displaying the display information in a mode not including the character information in a case where the display unit is present outside the first visual field.

\* \* \* \* \*